United States Patent [19]

Thalmann et al.

[11] Patent Number: 4,618,168
[45] Date of Patent: Oct. 21, 1986

[54] APPARATUS FOR THE HEAT-SEALING THERMOPLASTIC CONDUITS WITH A BRIDGING CONDUCTOR

[75] Inventors: Alfred Thalmann, Uhwiesen; Ernesto Lehmann, Schaffhausen, both of Switzerland

[73] Assignee: Georg Fischer Aktiengesellschaft, Schaffhausen, Switzerland

[21] Appl. No.: 576,333

[22] Filed: Feb. 2, 1984

[30] Foreign Application Priority Data

Feb. 4, 1983 [CH] Switzerland ........................ 638/83

[51] Int. Cl.⁴ ............................................ F16L 47/02
[52] U.S. Cl. .................................... 285/21; 219/535; 219/544; 219/499; 219/517; 264/230; 156/294; 156/379.7; 156/273.9; 156/304.3; 156/304.6
[58] Field of Search ............... 285/21, 417; 156/273.5, 156/273.9, 304.3, 304.6, 304.2, 274.2, 294, 379.7; 264/230; 219/535, 544, 499, 517

[56] References Cited

U.S. PATENT DOCUMENTS

| 3,378,672 | 4/1968 | Blumenkranz | 285/21 |
| 3,506,519 | 4/1970 | Blumenkranz | 156/273.9 |
| 4,096,017 | 6/1978 | Wyke | 156/274.2 |
| 4,224,505 | 9/1980 | Sturm | 219/544 |
| 4,455,482 | 6/1984 | Grandclement | 285/21 |
| 4,486,650 | 12/1984 | Bridgstock | 219/544 |
| 4,493,985 | 1/1985 | Keller | 219/535 |
| 4,530,521 | 7/1985 | Nyffeler | 285/21 |
| 4,536,644 | 8/1985 | Thalmann | 285/21 |

FOREIGN PATENT DOCUMENTS

| 0036963 | 10/1981 | European Pat. Off. . |
| 2242369 | 6/1973 | Fed. Rep. of Germany . |
| 1416207 | 9/1965 | France | 285/21 |
| 532996 | 3/1923 | Switzerland . |
| 553368 | 8/1984 | Switzerland . |
| 143282 | 1/1961 | U.S.S.R. | 285/21 |

Primary Examiner—Cornelius J. Husar
Assistant Examiner—Eric K. Nicholson
Attorney, Agent, or Firm—Roylance, Abrams, Berdo & Goodman

[57] ABSTRACT

A system for heat-sealing thermoplastic conduits involves a thermoplastic sleeve surrounding an electrically conductive heating wire arranged in a coil. A bridging conductor is located adjacent the heating element, but is separated from it by an insulation layer of predetermined thickness. When the sleeve is heated by supplying electric power to the heating element, the entire heating element generates heat during a first phase in which fusion pressure is applied between the sleeve and pipes being connected. The bridging connector is forced into contact with selected coils of the heating element to initiate a second phase. In the second phase, the heat produced in the area of the selected coils is automatically reduced by short circuiting such coils.

14 Claims, 3 Drawing Figures

# APPARATUS FOR THE HEAT-SEALING THERMOPLASTIC CONDUITS WITH A BRIDGING CONDUCTOR

FIELD OF THE INVENTION

The present invention relates to a process and apparatus for heat-sealing thermoplastic conduits employing an electrical resistance wire.

BACKGROUND OF THE INVENTION

In heat-sealing thermoplastic parts, as disclosed in CH-PS 532,996 and DE-PS 2,242,369, large temperature differentials in the parts being heat sealed should be avoided. Large temperature differentials are avoided to prevent development of superimposed and uncontrollable material stresses.

Two adjacent pipe ends can be connected by an electrically operated heat-sealing apparatus in the form of a sleeve or saddle member mounted on the pipes. The sleeve or saddle member must tightly contact surfaces of the pipes being connected, at least in the zones in which the desired heat-seal is formed. With sleeves, such as that disclosed in EP-A1-0036 963, the tight engagement with the pipes results from shrinking the sleeve. Shrinking of the sleeve is accomplished by forming inherent shrinkage stresses in the sleeve by the injection molding process or other manufacturing steps. The stresses are relieved when the sleeve is heated causing the sleeve to shrink tightly about the adjacent pipe surfaces. For saddle members, as in DE-PS 2,242,369, a mechanical force is applied to the exterior of the saddle members or on a bracket to compress the saddle members tightly about the pipes being connected.

The seam between the pipes being connected is subjected to a bearing load during the entire process when electrical energy is supplied to the heating element. The bearing load produces the fusion pressure required to provide a good heat-seal.

Advantageously, the parts to be connected are heated as uniformly as possible throughout their entire thicknesses in the seam area and across the entire surfaces to be joined. The uniform heating minimizes undesirable stresses caused by only partial heating. Heat-sealing sleeves with a heating coil passing through them, as in EP-A1-0036 963, can provide the desired uniform heating. Such sleeves can heat the pipe ends being joined through their entire thicknesses and along the entire length of the sleeve which defines the sealing zone.

The heat-shrinkable sleeve with a heating coil uniformly compresses and heats the connected parts, as well as minimizes stress differentials in the subsequently formed heat-seal.

Conventional systems for heat-sealing thermoplastic pipes are disadvantageous, particularly for relatively thin-walled pipes. Thin-walled pipe ends collapse or deform during the process such that insufficient fusion pressure is developed at the pipe ends. The lack of adequate pressure permits melted material to flow between the pipe ends and into the pipe interior forming a burr. The flow of melted material into the seam area is increased in systems where the heating wires are forced into the seam area applying concentrated heat energy to an undesirable degree in the connection. These disadvantages are further intensified with materials having a high melt index.

In other conventional systems (e.g., CH-A 553,368), the heat-sealing sleeves do not have heating coils in their central areas. The omission of a heating coil in the central area avoids heating the pipe ends to a significant degree. This prevents collapse and deformation of the thin-walled pipe ends such that melted material does not pass between the pipe ends. However, these systems produce non-uniform heating in the heat-sealing sleeve such that the sleeve cannot be properly shrunk-fitted in its central area. The non-uniform shrinking of the sleeve creates a high differential of internal stresses in the sleeve which adversely affects the life of the connection formed thereby.

SUMMARY OF THE INVENTION

An object of the present invention is to provide a process and apparatus for heat-sealing thermoplastic conduits in which a coupling element surrounding the conduit ends is heated across its entire length, without overheating the immediate seam area between the conduits.

Another object of the present invention is to provide a process for connecting conduits which is simple and inexpensive to perform and which is reliable.

A further object of the present invention is to provide an apparatus for heat-sealing thermoplastic conduits which is simple and inexpensive to manufacture and use, and which is of rugged construction.

A still further object of the present invention is to provide a method and apparatus for heat-sealing thermoplastic conduits which have relative thin walls, and/or high melt index, while ensuring reliable operation.

The foregoing objects are obtained by a process for heat-sealing thermoplastic conduits, comprising supplying electrical energy to an electrically conductive heating element located adjacent the thermoplastic conduits being connected. Heat is produced in the heating elements in a first phase and in a second phase, where the first and second phases are different. Fusion pressure developed during the first phase automatically switches the process from the first phase to the second phase.

The foregoing objects are also obtained by an apparatus for heat-sealing thermoplastic conduits comprising a coupling element, an electrically conductive heating element within the coupling element, and a bridging conductor. The bridging conductor is located adjacent the heating element, but is spaced from it by insulation. The coupling element can be compressed about the conduits.

With the system of the present invention, heat is produced in two phases in the heating element, with the switching from the first phase to the second phase being automatically triggered by the fusion pressure developed during the first phase. In the second phase, the heat generated by the heating element in the area of the conduit ends is reduced to prevent collapse and deformation of the conduit ends. Advantageously, the heat generated at the conduit ends is reduced by electrically bridging a portion of the heating element in the area of desired reduced heating. The bridging of a portion of the heating element prevents electrical energy from passing through that portion.

The automatic briding of a portion of the heating element is preferably accomplished by the bridging conductor located adjacent to the heating element, but spaced from it by insulation.

In this manner, an excellent, low-stress heat-seal connection is obtained by a system which is simple to operate, eliminates additional electrical controls to monitor the electric power supplied to the apparatus and avoids deformation of the pipe ends.

Other objects, advantages and salient features of the present invention will become apparent from the following detailed description, which, taken into conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF PREFERRED EMBODIMENTS OF THE INVENTION

Figure 1:
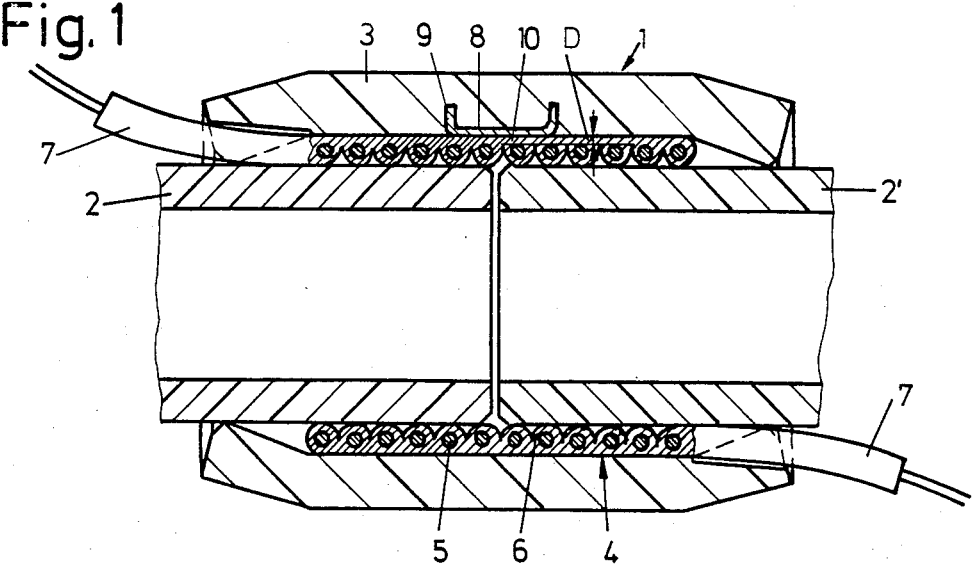
FIG. 1 is a side elevation view in section of an apparatus according to the present invention before the heat-sealing process.
Figure 2:
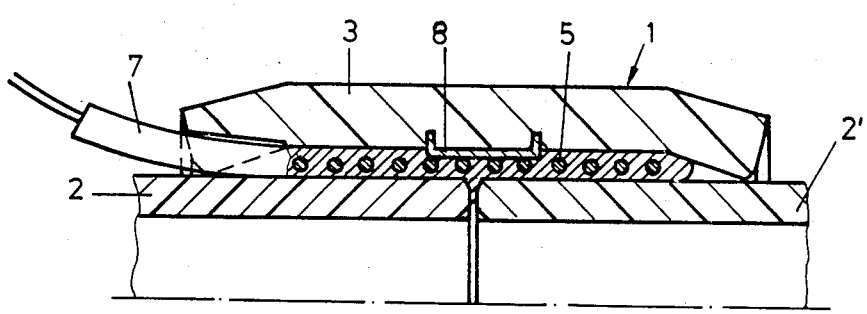
FIG. 2 is a partial, side elevational view in section of the apparatus of FIG. 1, during the heat-sealing process.

Referring initially to FIGS. 1 and 2, the heat-sealing apparatus 1 comprises a cylindrical sleeve member 3 of thermoplastic material for connecting thermoplastic parts, such as thermoplastic pipes 2 and 2'. The sleeve member has a helically wound, electrically conductive heating element or resistance wire 5 surrounded by a thermoplastic covering 6 and forming a coil 4. The coil is compacted by heat-sealing the individual coils or turns, preferably on their outer portions.

Heating element 5 is preferably wound in a single helical coil. Each wire end 7 extends outwardly beyond sleeve member 3 for connection to an electrical source of energy at the ends of the sleeve member.

The coil is forced into the cylindrical sleeve member while the sleeve member is heated. Forming the apparatus in this manner increases the inherent stresses in the sleeve member due to the widening of the sleeve member.

Prior to the insertion of coil 4 within sleeve member 3, a bridging conductor 8 is inserted in the sleeve member. The bridging conductor is in the form of a wire (e.g., copper wire) secured in sleeve member 3 adjacent its inner surface and the area in which the ends of pipes 2 and 2' are received.

Bridging conductor 8 extends parallel to the axis of sleeve member 3 and coil 4 over and adjacent a selected plurality of coils. Two radically outwardly extending arms 9 are provided on the ends of conductor 8 for anchoring the briding conductor within sleeve member 3. Prior to the heat-sealing operation, a thermoplastic insulation layer 10 having a predetermined thickness D is provided between bridging conductor 8 and heating element 5. In the illustrated embodiment, conductor 8 is exposed on the inner surface of sleeve member 3 such that the thickness of coil covering 6 provides the insulation layer 10.

In lieu of providing heating element 5 with a covering 6, element 5 can be uncovered wire located in grooves in sleeve member 3 or can be formed as part of sleeve member 3 in an injection molding process. In such circumstances, insulation layer 10 must be formed as part of the sleeve member between the heating element and the bridging conductor.

The configuration and arrangement of bridging conductor 8 can be varied from the copper wire illustrated. For example, the bridging conductor can be formed as strips of sheet metal placed at several points about the circumference of coil 4, or as strips of sheet metal surrounding the entire circumference of coil 4. In either case, an insulation layer of predetermined thickness must be present between the sheet metal strips and heating element 5.

The process of the present invention is illustrated by heat-sealing two pipes with apparatus 1.

Once the ends of pipes 2 and 2' are inserted within sleeve member 3 and coil 4, the wire ends 7 of the coil are connected to a source of electrical energy. The heat-sealing process is initiated with the connection of the electrical power.

Initially, the apparatus operates in a first phase in which the sleeve member and the pipe ends are heated along the entire length of coil 4 until the thermoplastic material of the sleeve member and pipes contacted by coil 4 are plastically deformable. At this time, the shrink stresses inherent within sleeve member 3 cause sleeve member 3 to shrink about pipes 2 and 2'. Shrinkage of sleeve member 3 creates a radially inwardly directed pressure producing a tight engagement of sleeve member 3, covering 6 of coil 4, and the outer surfaces adjacent the ends of pipes 2 and 2'.

The radial pressure generated by the shrinkage of the sleeve member and the heating of the thermoplastic material displace insulation layer 10, as illustrated in FIG. 2, such that bridging conductor 8 is brought into direct metal-to-metal contact with a selected plurality of coils or turns of heating element 5. The contacting of bridging conductor 8 with a selected plurality of the coils initiates or triggers a second phase of the heating process automatically.

In the second phase, only very low heat or no heat is produced in the selected coils contacted by the bridging conductor. Since the bridging conductor is located intermediate the ends of apparatus 1, the selected coils are located in the middle area adjacent the seam between the two pipe ends. Thus, the thermoplastic material of the apparatus in the area of the seam between the two pipe ends is not softened or melted to too great an extent and does not flow into the inside of the pipe through the seam. Additionally, the ends of the pipes are not deformed. The coils of heating element 5 extending axially outwardly of the selected shorted coils produce more heat during the second phase. The additional heat produced by these coils further melts the thermoplastic material to ensure an excellent heat-seal connection between the pipes and sleeve member 3.

Figure 3:
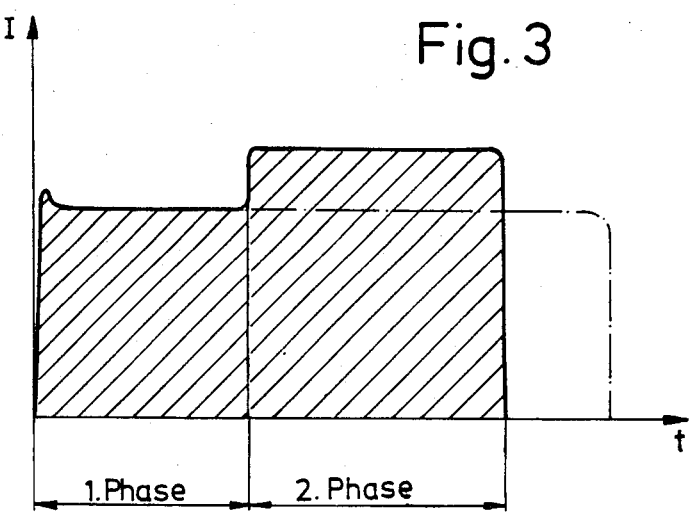
FIG. 3 is a current-time diagram of the heat-sealing process.

FIG. 3 comprises a plot of current verses heat-sealing time. As illustrated, the current during the second phase rises due to the lowering of the total resistance of coil 4 to produce higher heating. The higher heating permits the heat-sealing time for the process to be reduced. The current I is dependent upon the heat-sealing time t. In the plot, the lined area compares the heat volume for the two phases. The dot-dash line shows the heating time required for identical heat volumes according to a heat-sealing process which does not incorporate the present invention of two-phase operation.

The heat-sealing process of the present invention is not limited to use with heat-sealing sleeves with closed coils. The process can also be used for heat-sealing parts employing heating mats which are laid about the parts to be heat-sealed. The brackets or saddle members span and cover the heating mats. This type of heat-sealing apparatus is described in DE-PS2,242,369 and EP-A2 0035 750.

With these alternative arrangements. a bridging conductor with an insulation layer must be mounted in the bracket or saddle member to initially separate the heating element of the mat from the bridging conductor. Fusion pressure is produced by an external force generated by a mechanism clamping the brackets or saddle members together. Once the electrical power is connected to the heating mat, the process operates as set forth hereinabove.

The bridging conductor can comprise an additional heating element or a resistance wire which produces additional heat to provide two or more separate phases within the system of the present invention. For different insulation layer thicknesses, additional heat can be produced locally at different times. The sequence and amount of the local heat production can be adapted to the desired results without additional disconnections of the heat source and costly additional circuits in the heat-sealing apparatus.

The sequence of the individual phases is also controlled by the thickness D of insulation 10 between heating element 5 and bridging conductor 8.

While various embodiments have been chosen to illustrate the invention, it will be understood by those skilled in the art that various changes and modifications can be made therein without departing from the scope of the invention as defined in the appended claims.

What is claimed is:

1. An apparatus for heat-sealing thermoplastic conduits, comprising:
   a coupling element;
   an electrically conductive heating element within said coupling element;
   at least one bridging conductor adjacent said heating element, but spaced therefrom by insulation, said bridging conductor having a length substantially less than that of said heating element such that only a portion of said heating element is bridged by said bridging conductor upon displacement of said insulation; and
   means for compressing said coupling element about the conduits.

2. An apparatus according to claim 1 wherein said bridging conductor comprises a short circuit conductor of low ohmic resistance.

3. An apparatus according to claim 2 wherein said short circuit conductor is a wire.

4. An apparatus according to claim 3 wherein said wire is a copper wire.

5. An apparatus according to claim 2 wherein said bridging conductor is located adjacent means for receiving adjacent ends of conduits being connected.

6. An apparatus according to claim 1 wherein said bridging conductor is located adjacent means for receiving adjacent ends of conduits being connected.

7. An apparatus according to claim 1 wherein said insulation between said bridging conductor and said heating element has a predetermined thickness which will soften permitting said bridging conductor to contact said heating element in a predetermined time.

8. An apparatus according to claim 2 wherein said insulation between said bridging conductor and said heating element has a predetermined thickness which will soften permitting said bridging conductor to contact said heating element in a predetermined time.

9. An apparatus according to claim 1 wherein said bridging conductor comprises an additional heating element.

10. An apparatus for heat-sealing thermoplastic conduits, comprising
    a sleeve of thermoplastic material having inherent shrinkage stresses causing said sleeve to shrink upon being heated, and having an inner surface and opposite longitudinal ends;
    an electrically conductive heating wire arranged in a coil in said sleeve adjacent said inner surface; and
    an electrically conductive bridging conductor in said sleeve spaced radially outwardly of said coil and separated from said coil by a relatively thin layer of thermoplastic material;
    whereby, upon supplying electrical energy to said coil during a first phase, said thin layer will soften and said sleeve will shrink such that said bridging conductor will electrically contact a portion of said coil initiating a second phase in which less heat is generated in said portion than in remaining portions of said coil.

11. An apparatus according to claim 10 wherein said bridging conductor is centrally located between said longitudinal ends of said sleeve.

12. An apparatus according to claim 1 wherein said coupling element comprises a sleeve of thermoplastic material.

13. An apparatus according to claim 12 wherein said sleeve comprises inherent shrinkage stresses causing said sleeve to shrink upon being heated.

14. An apparatus according to claim 10 wherein said bridging conductor has an axial length less than that of said coil.

* * * * *